C. M. A. ROSENDAHL.
MOTOR CYCLE SPRING.
APPLICATION FILED MAY 22, 1914.
1,135,927.
Patented Apr. 13, 1915.
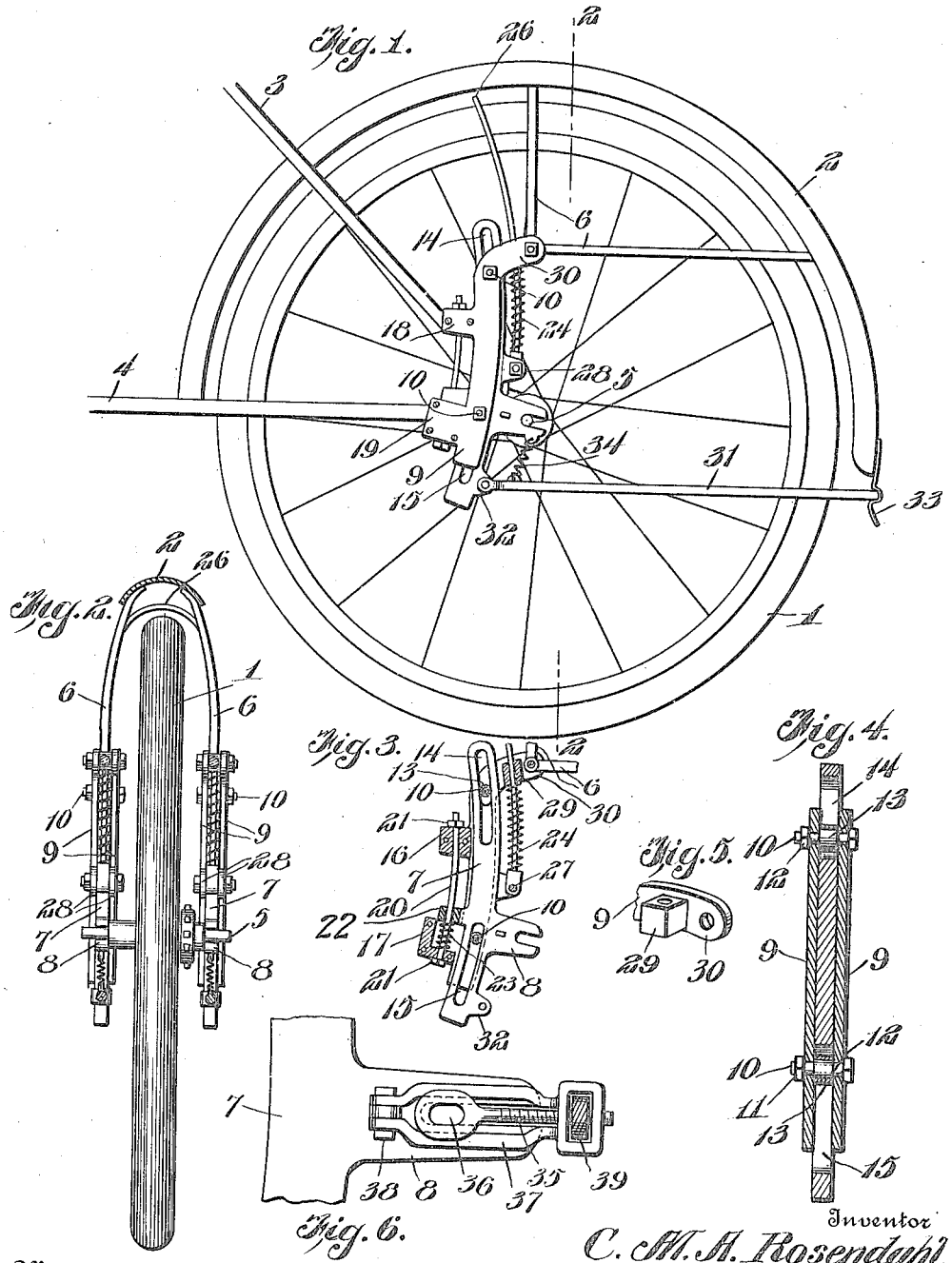

UNITED STATES PATENT OFFICE.

CARL M. A. ROSENDAHL, OF KINDRED, NORTH DAKOTA.

MOTOR-CYCLE SPRING.

1,135,927.   Specification of Letters Patent.   Patented Apr. 13, 1915.

Application filed May 22, 1914. Serial No. 840,321.

*To all whom it may concern:*

Be it known that I, CARL M. A. ROSENDAHL, a citizen of the United States, residing at Kindred, in the county of Cass and State of North Dakota, have invented new and useful Improvements in Motor-Cycle Springs, of which the following is a specification.

This invention relates to springs for motorcycles, bicycles and similar vehicles, the object in view being to provide a spring mounting for the rear driving wheel of such a machine which will add to the comfort of the rider and increase the life and durability of the machine as a whole by absorbing the road shocks.

With the above and other objects in view, the invention consists in the novel construction, combination and arrangement of parts, as will be hereinafter more fully described, illustrated and claimed.

In the accompanying drawings: Figure 1 is a side elevation of the rear portion of a motorcycle showing the spring construction of this invention applied thereto. Fig. 2 is a vertical cross section on the line 2—2 of Fig. 1. Fig. 3 is a vertical longitudinal section taken between one pair of yokes. Fig. 4 is a cross section at right angles to Fig. 3. Fig. 5 is a fragmentary perspective view of one of the yokes. Fig. 6 is a detail plan view of the chain adjusting device.

Referring to the drawings 1 designates the rear driving wheel of a motorcycle, 2 the rear mud guard, 3 the rear braces, 4 the rear fork arms, 5 the rear axle and 6 the supporting rods for the mud guard or fender 2.

In carrying out this invention, I provide two curved guides 7 arranged at opposite sides of the driving wheel and each provided with an axle receiving forked or slotted extension 8 in which the opposite end portions of the axle 5 are clamped and capable of adjustment for the purpose of tightening the driving chain (not shown).

In connection with each of the guides 7 I employ a pair of parallel yokes 9 arranged in spaced relation to each other and at opposite sides of the respective guide 7, the yokes 9 being connected at points distant from each other by means of cross pins 10 reduced at their ends and threaded as shown to receive nuts 11 and also shouldered at 12 to abut against the inner faces of the yokes 9. Around each of said pins 10 is journaled an anti-friction roller 13. The rollers 13 are movable lengthwise of curvilinear slots 14 and 15 in the interposed guide 7 so that said guide serves to direct the up and down sliding movement of the yokes.

The yokes are connected together at points distant from each other by cross pieces 16 and 17 which are secured to ears 18 and 19 on the yokes 9. The rear braces 3 are rigidly connected to the upper cross piece 16 and the rear fork arms 4 are similarly connected to the bottom cross piece 17. A curved rod 20 passes through the upper and lower cross pieces 16 and 17 as shown in Fig. 3 and is fastened thereto by nuts 21, said rod passing through a lug 22 on the guide 7. Beneath the lug 22, a coiled expansion check spring 23 is arranged which is supported at its lower end by the bottom cross piece 17, said spring 23 serving to check the rebound or upward movement of the frame. The downward movement of the frame of the motorcycle is checked by means of a coiled expansion spring 24 which passes around one of the side or terminal portions 25 of a rod which is arched over the wheel 1 as shown at 26, the ends of the rod being fastened at 27 to ears 28 extending from the rear sides of the guides 7. The arched rod thus serves as an equalizer, distributing the weight on both springs 24, it being understood that the spring 24 is duplicated at each side of the driving wheel. The side portions 25 of the equalizing rod slide through guides 29 between rearward extensions 30 at the upper extremities of the yokes 9.

31 designates a rest which is pivotally connected to lugs 32 on the guides 7 and upheld by a spring catch 33 at the rear extremity of the fender or mud guard 2. 34 designates a spring interposed between the rest 31 and ears 28 on the guides 7 to assist in lifting the rest 31 and upholding the same when not in use.

35 designates a chain adjuster having an opening 36 for the rear axle and mounted in a link 37 pivotally connected at 38 to the lug 8 of one of the guides 7 as shown in Fig. 6, said adjuster being shiftable in a fore and aft direction by means of a nut 39. Two of such chain adjusters are used, one at each side of the driving wheel.

From the foregoing description it will now be understood that the rear fork arms 4 and rear braces 3 are rigidly connected to and by the yokes 9 and that two sets of yokes are employed, one set at each side of the driving wheel and each set operating in conjunction with a guide which is supported by the rear axle 5 of the machine. Both the up and down movements of the yokes are cushioned by the main supporting springs 24 and the rebound check springs 23 thus imparting an easy, smooth and elastic action to the rear wheel and absorbing all ordinary road shocks, adding to the comfort of the rider and increasing the life and durability of the machine and mechanism thereon.

What I claim is:—

1. Rear spring construction for motorcycles, comprising upright curvilinear guides carried by the driving wheel axle at opposite sides of the driving wheel, yokes slidingly attached to opposite sides of each of said guides and having the rear fork arms and braces fastened thereto, and cushioning springs for supporting and resisting the up and down movements of said yokes relatively to said guides.

2. Rear spring construction for motorcycles, comprising upright curvilinear guides carried by the driving wheel axle at opposite sides of the driving wheel, yokes slidingly attached to opposite sides of each of said guides and having the rear fork arms and braces fastened thereto, an equalizing connection fastened to both guides and extending over the wheel, and cushioning springs for supporting and resisting the up and down movements of said yokes relatively to said guides.

3. Rear spring construction for motorcycles, comprising upright curvilinear guides carried by the driving wheel axle at opposite sides of the driving wheel, yokes slidingly attached to opposite sides of each of said guides and having the rear fork arms and braces fastened thereto, an equalizing connection fastened to both guides and extending over the wheel, and cushioning springs for supporting and resisting the up and down movements of said yokes relatively to said guides, certain of said springs being coiled around said equalizing connection.

In testimony whereof I affix my signature in presence of two witnesses.

CARL M. A. ROSENDAHL.

Witnesses:
ADOLPH DOKKEN,
JOHN OTTIS.

Copies of this patent may be obtained for five cents each, by addressing the "Commissioner of Patents, Washington, D. C."